United States Patent
Ji et al.

(10) Patent No.: US 12,188,850 B2
(45) Date of Patent: Jan. 7, 2025

(54) FREQUENCY DOMAIN FEEDFORWARD COMPENSATION METHOD FOR SEISMIC SIMULATION SHAKING TABLE BASED ON POWER EXPONENTIAL METHOD

(71) Applicant: Beijing University of Technology, Beijing (CN)

(72) Inventors: Jinbao Ji, Beijing (CN); Sen Yang, Beijing (CN); Zongxiang Hu, Beijing (CN); Weiqi Zhang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/741,474

(22) Filed: May 11, 2022

(65) Prior Publication Data
US 2022/0404232 A1 Dec. 22, 2022

(30) Foreign Application Priority Data
Jun. 16, 2021 (CN) .......................... 202110663726.3

(51) Int. Cl.
*G01M 7/02* (2006.01)
(52) U.S. Cl.
CPC .............. *G01M 7/025* (2013.01); *G01M 7/02* (2013.01)
(58) Field of Classification Search
None
See application file for complete search history.

(56) References Cited

U.S. PATENT DOCUMENTS

| 6,189,385 B1 * | 2/2001 | Horiuchi | G01M 7/04 73/664 |
| 9,317,044 B2 * | 4/2016 | Zhuge | G05D 19/02 |
| 2010/0305886 A1 * | 12/2010 | Zhuge | G05B 19/19 702/56 |

FOREIGN PATENT DOCUMENTS

| CN | 101832849 A | | 9/2010 | |
| CN | 108287047 A | * | 7/2018 | ............ G01M 7/022 |
| CN | 108716974 A | | 10/2018 | |

(Continued)

OTHER PUBLICATIONS

Ji Jinbao, et al., Shaking Table Control Parameter Tuning Technology Based on Frequency Domain Identification, Industrial Construction, 2014, pp. 424-427, vol. 44.

*Primary Examiner* — Matthew G Marini
(74) *Attorney, Agent, or Firm* — Li & Cai Intellectual Property (USA) Office

(57) ABSTRACT

A frequency domain feedforward compensation method based on a power exponential method for a seismic simulation shaking table is provided. According to the method, a frequency domain amplitude transfer function of a system is identified, the frequency domain amplitude transfer function is modified by adjusting the power and limiting an amplitude, then an inverse frequency domain amplitude transfer function is obtained, an amplitude and a phase of a driving acceleration signal are computed, finally a time domain driving acceleration signal is obtained by using the Euler's formula for computation in a complex domain and conducting inverse Fourier transform, the shaking table is driven again to collect an acceleration signal output by a table top, whether the acceleration signal meets a shaking table test waveform use requirement is determined, a test is finished under the condition that the acceleration signal meets the shaking table test waveform use requirement.

1 Claim, 6 Drawing Sheets

(56) References Cited

FOREIGN PATENT DOCUMENTS

| | | |
|---|---|---|
| CN | 110657933 A | 1/2020 |
| CN | 110657934 A | 1/2020 |
| CN | 110672290 A | 1/2020 |
| JP | 2011169866 A | 9/2011 |

* cited by examiner

FREQUENCY DOMAIN FEEDFORWARD COMPENSATION METHOD FOR SEISMIC SIMULATION SHAKING TABLE BASED ON POWER EXPONENTIAL METHOD

CROSS REFERENCE TO THE RELATED APPLICATIONS

This application is based upon and claims priority to Chinese Patent Application No. 202110663726.3 filed on Jun. 16, 2021, the entire contents of which are incorporated herein by reference.

TECHNICAL FIELD

The present disclosure relates to a frequency domain feedforward compensation method based on a power exponential method for a seismic simulation shaking table, and belongs to the technical field of structural tests.

BACKGROUND

A seismic simulation shaking table, important equipment for studying dynamic performance of structures under earthquake, can reproduce an earthquake process, is convenient in loading and can repeat tests many times. It is generally recognized in the structural model or partial prototype structure test, and is widely used in the fields of studying structural dynamic characteristics, seismic performance of equipment, checking structural seismic measures, and structural seismic response and failure mechanism. Accuracy of a recurrent signal is crucial for the self-control and model test of the seismic simulation shaking table, which is one of main indexes to measure performance of a shaking table. However, the recurrent signal often cannot satisfy an expected goal because of the whole complex shaking table system, nonlinear factors such as hydraulic system characteristics, mechanical transmission performance and sensor characteristics, and nonlinear effects of a model. The traditional iterative learning control technology of the shaking table directly uses a method for direct iteration or modified iteration through a system frequency domain amplitude transfer function, which improves accuracy of the recurrent signal to a certain extent, but its frequency domain amplitude transfer function of the system does not converge at some frequency points or has a low convergence speed, resulting in high distortion of a waveform output by the shaking table, low recurrence accuracy and more required iterations.

SUMMARY

An objective of the present disclosure is to provide a frequency domain feedforward compensation method based on a power exponential method for a seismic simulation shaking table. Based on identification of a frequency domain amplitude transfer function of a system, the method uses the power exponential method to adjust the power of the frequency domain amplitude transfer function and limit minimum and maximum values of an amplitude to modify the frequency domain amplitude transfer function. An amplitude of a target acceleration signal is adjusted by using a modified frequency domain amplitude transfer function, and a phase of the target acceleration signal is modified, so as to generate a driving acceleration signal. The power exponential method is used to limit the power of the frequency domain amplitude transfer function to 0 to 1, when a value of the frequency domain amplitude transfer function is less than 1, an amplification effect is achieved, and when the value of the frequency domain amplitude transfer function is greater than 1, a subtraction effect is achieved, thus making the value of the frequency domain amplitude transfer function approach to 1. With the power adjusted and the minimum and maximum values of the amplitude of the frequency domain amplitude transfer function limited, the situation that a small number is too small and a large number is too large in values of the frequency domain amplitude transfer function may be avoided, the phase of the target acceleration signal is modified, and finally the driving acceleration signal is generated and then is input into a shaking table system to obtain a desirable acceleration signal. According to the present disclosure, with the driving acceleration signal iteratively updated, a recurrent waveform of the shaking table system converges quickly, with fewer iterations and shorter time consumption, and waveform recurrence accuracy and control performance of the shaking table system may be effectively improved.

The present disclosure is achieved through the following technical solution:

The frequency domain feedforward compensation method based on a power exponential method for a seismic simulation shaking table, where a target acceleration signal $a(n)$ is input into the shaking table system to obtain a feedback acceleration signal $y(n)$, the target acceleration signal $a(n)$ and the feedback acceleration signal $y(n)$ are subjected to Fourier transform separately, a frequency domain amplitude transfer function $H(f)$ is computed by using an amplitude, the frequency domain amplitude transfer function $H(f)$ is modified by using the power exponential method, the power of the frequency domain amplitude transfer function $H(f)$ is adjusted, a power value is between 0 and 1, minimum and maximum values of the amplitude are limited, an inverse frequency domain amplitude transfer function $H^{-1}(f)$ of a system is computed, the inverse frequency domain amplitude transfer function is multiplied by an amplitude of a target acceleration signal $a(f)$ so as to obtain an amplitude of a driving acceleration signal $u(f)$, a phase of the driving acceleration signal $u(f)$ is obtained by subtracting a phase difference between the feedback acceleration signal $y(f)$ and the target acceleration signal $a(f)$ from a phase of the target acceleration signal $a(f)$, a frequency domain driving acceleration signal $u(f)$ is obtained by using the Euler's formula in a complex domain and then is subjected to inverse Fourier transform to obtain a time domain driving acceleration signal $u(n)$, a shaking table is driven again to collect an acceleration signal $y_d(n)$ output by a table top, whether the acceleration signal $y_d(n)$ output by the table top meets a shaking table test waveform use requirement is determined by means of a waveform evaluation index, a test is finished under the condition that the acceleration signal meets the shaking table test waveform use requirement, and the power of the frequency domain amplitude transfer function $H(f)$ is updated and the driving acceleration signal $u(n)$ is generated again for the test according to the method under the condition that the acceleration signal does not meet the shaking table test waveform use requirement.

The frequency domain amplitude transfer function of the system is computed, specifically, the target acceleration signal $a(n)$ is input into the shaking table system to obtain the feedback acceleration signal $y(n)$, Fourier transform is conducted on the target acceleration signal $a(n)$ and the feedback acceleration signal $y(n)$ separately, and the frequency domain amplitude transfer function $H(f)$ is computed by using amplitudes.

$$H(f) = \frac{|y(f)|}{|a(f)|}$$

y(f) is a frequency spectrum of the feedback acceleration signal y(n), and a(f) is a frequency spectrum of the target acceleration signal a(n).

Modifying the frequency domain amplitude transfer function H(f) includes:

S1, adjusting the power of the frequency domain amplitude transfer function H(f) of the system, $$H(f) = \left(\frac{|y(f)|}{|a(f)|}\right)^{\beta}$$

where $\beta \in (0, 1)$, frequency spectra of an input signal and an output signal of an actual shaking table system are compared with each other, under the condition that a relative error is greater than or equal to 50%, a value of $\beta$ is within (0, 0.5], and under the condition that the relative error is less than 50%, a value of $\beta$ is within (0.5, 0.9); and S2, limiting an amplitude of the frequency domain amplitude transfer function H(f) of the system according to set minimum amplitude and maximum amplitude, $$H(f) = \begin{cases} \min\{H(f)\}, & H(f) \leq \min\{H(f)\} \\ H(f), & \min\{H(f)\} < H(f) \leq \max\{H(f)\} \\ \max\{H(f)\}, & H(f) > \max\{H(f)\} \end{cases}$$

where $\min\{H(f)\}$ and $\max\{H(f)\}$ are the set minimum amplitude and maximum amplitude, respectively.

Generating the driving acceleration signal u(n) includes:

S1, conducting inversion on a modified frequency domain amplitude transfer function H(f) of the system so as to obtain the inverse frequency domain amplitude transfer function $H^{-1}(f)$ of the system;

S2, computing the amplitude of the driving acceleration signal u(f) by using the amplitude of the target acceleration signal a(f) and the inverse frequency domain amplitude transfer function $H^{-1}(f)$ of the system:

$$|u(f)| = |a(f)| * H^{-1}(f)$$

S3, computing the phase difference between the feedback acceleration signal y(f) and the target acceleration signal a(f), and modifying the phase of the target acceleration signal a(f), so as to obtain the phase of the driving acceleration signal u(f):

$$\angle u(f) = \angle a(f) - (\angle y(f) - \angle a(f))$$

S4, obtaining the frequency domain driving acceleration signal u(f) by using the Euler's formula in the complex domain, and conducting the inverse Fourier transform to obtain the time domain driving acceleration signal u(n):

$$u(f) = |u(f)| * \cos(\angle u(f)) + i * |u(f)| * \sin(\angle u(f))$$

$$u(n) = \text{IFFT}(u(f))$$

where IFFT means the inverse Fourier transform.

The shaking table is driven again to obtain an acceleration signal $y_d(n)$ output by the table top.

A waveform correlation coefficient and a relative root mean square error are used as waveform evaluation indexes to evaluate whether the acceleration signal $y_d(n)$ output by the table top meets the shaking table test waveform use requirement, and a computation formula is as follows:

waveform correlation coefficient:

$$K_{XY} = \frac{\sum_{i=1}^{n} X(i)Y(i)}{\sqrt{\sum_{i=1}^{n}(X(i))^2 \sum_{i=1}^{n}(Y(i))^2}}$$

relative root mean square error:

$$RRMSE = \sqrt{\frac{\sum_{i=1}^{n}(Y(i) - X(i))^2}{\sum_{i=1}^{n}(X(i))^2}}$$

where X is the target acceleration signal, Y is the feedback acceleration signal, and n is the number of sampling points.

The shaking table test waveform use requirement is as follows: the waveform correlation coefficient K≥95% and the relative root mean square error RRMSE≤10%, the test is finished under the condition that the requirement is met, and the power $\beta$ of the frequency domain amplitude transfer function H(f) is updated and the driving acceleration signal u(n) is generated again for the test under the condition that the requirement is not met.

Figure 1:
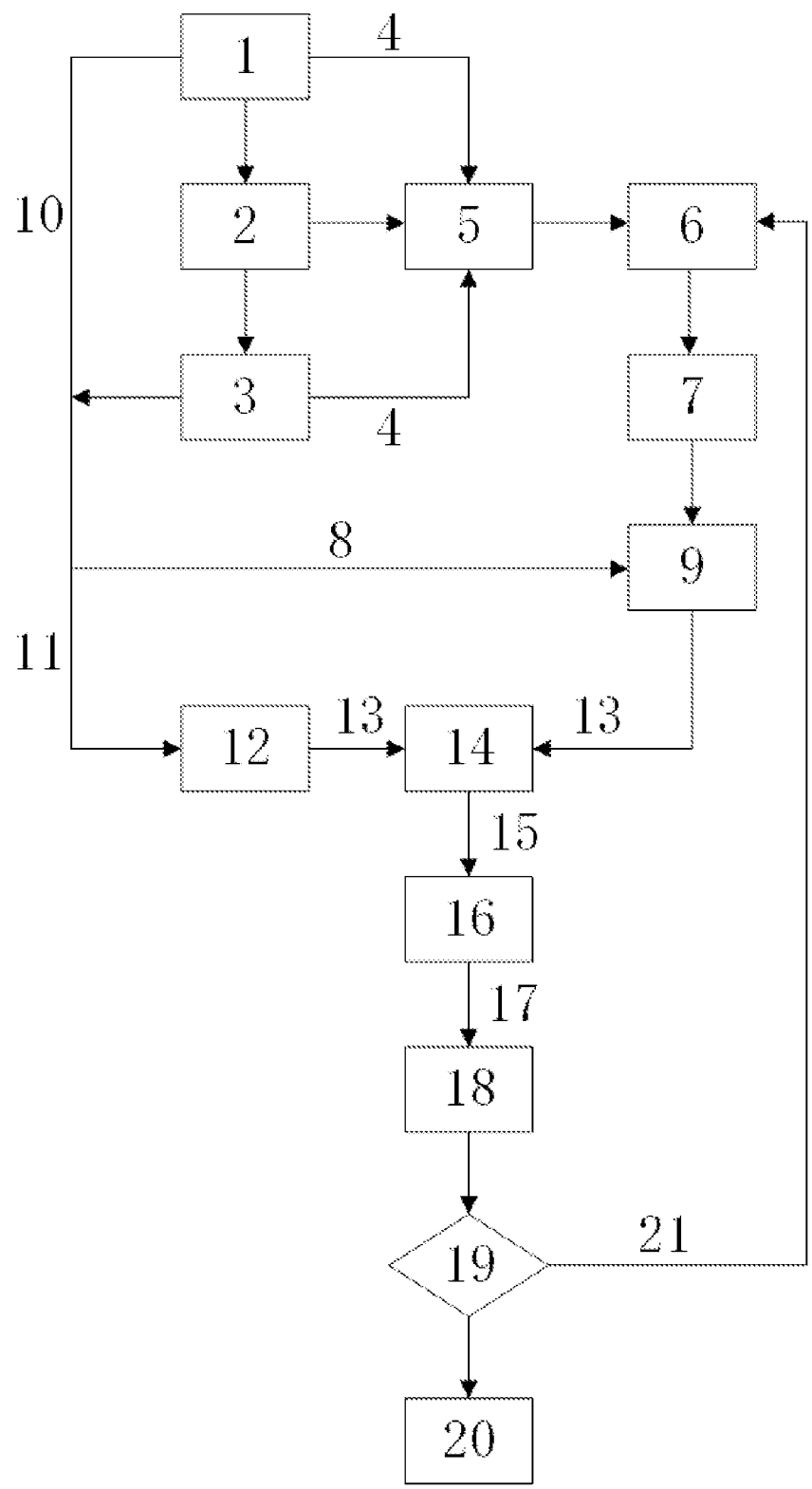
FIG. 1 is a flow diagram of a frequency domain feedforward compensation method based on a power exponential method for a seismic simulation shaking table of the present disclosure.

In the drawings: 1—target acceleration signal a(n), 2—shaking table system, 3—feedback acceleration signal y(n), 4—Fourier transform, 5—frequency domain amplitude transfer function H(f), 6—modified frequency domain amplitude transfer function H(f), 7—inverse frequency domain amplitude transfer function of system $H^{-1}(f)$, 8—amplitude of target acceleration signal a(n), 9—amplitude of driving acceleration signal u(f), 10—phase of target acceleration signal a(f), 11—phase difference between feedback acceleration signal y(f) and target acceleration signal a(f), 12—phase of driving acceleration signal u(f), 13—Euler's formula, 14—frequency domain driving acceleration signal u(f), 15—inverse Fourier transform, 16—time domain driving acceleration signal u(n), 17—drive shaking table again, 18—acceleration signal $y_d(n)$ output by table top, 19—waveform evaluation index, 20—finish test, and 21—update power $\beta$ of frequency domain amplitude transfer function H(f) and generate driving acceleration signal u(n) again for test.

Figure 2:
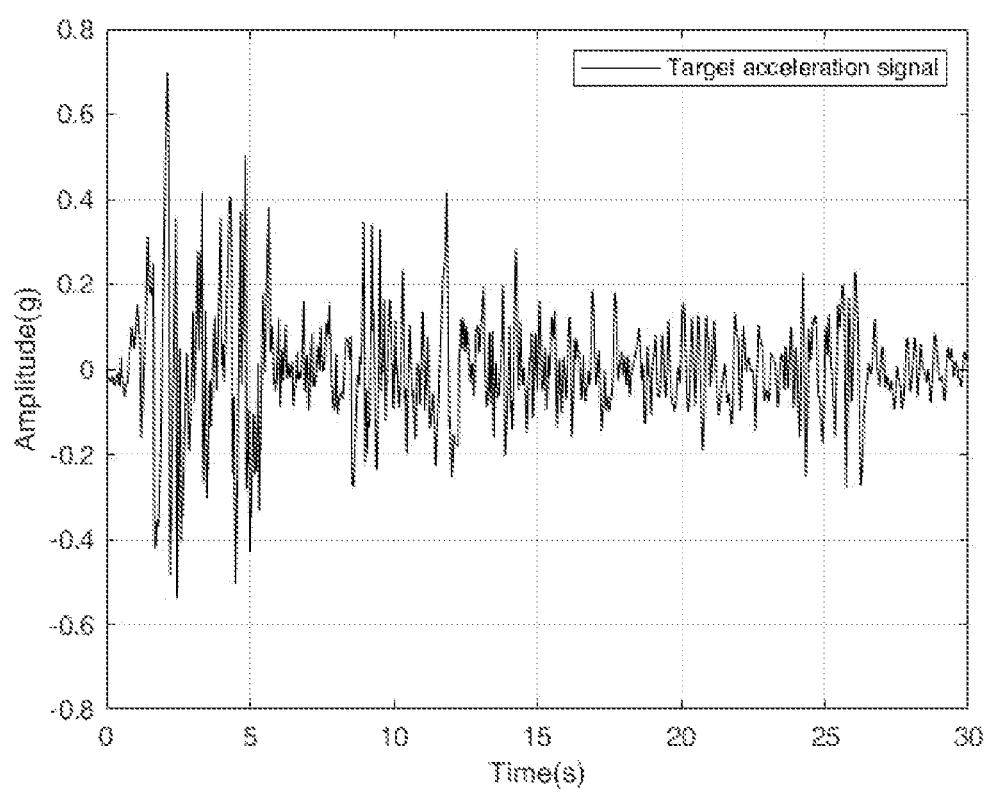
Figure 3:
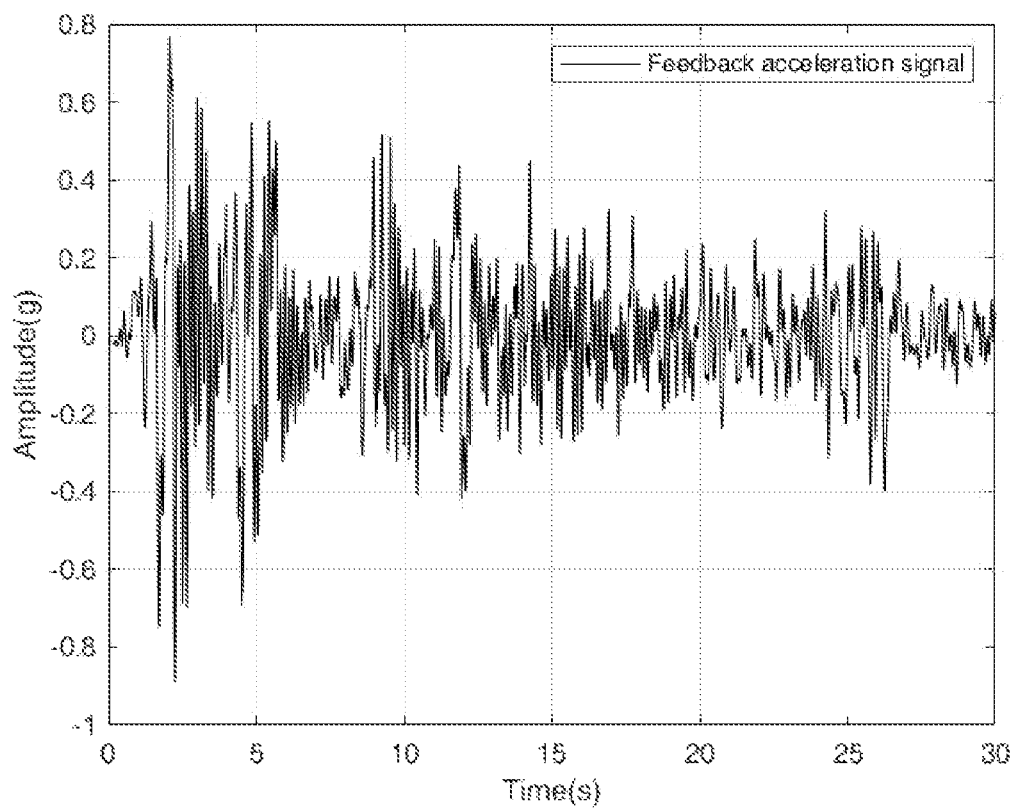
Figure 4:
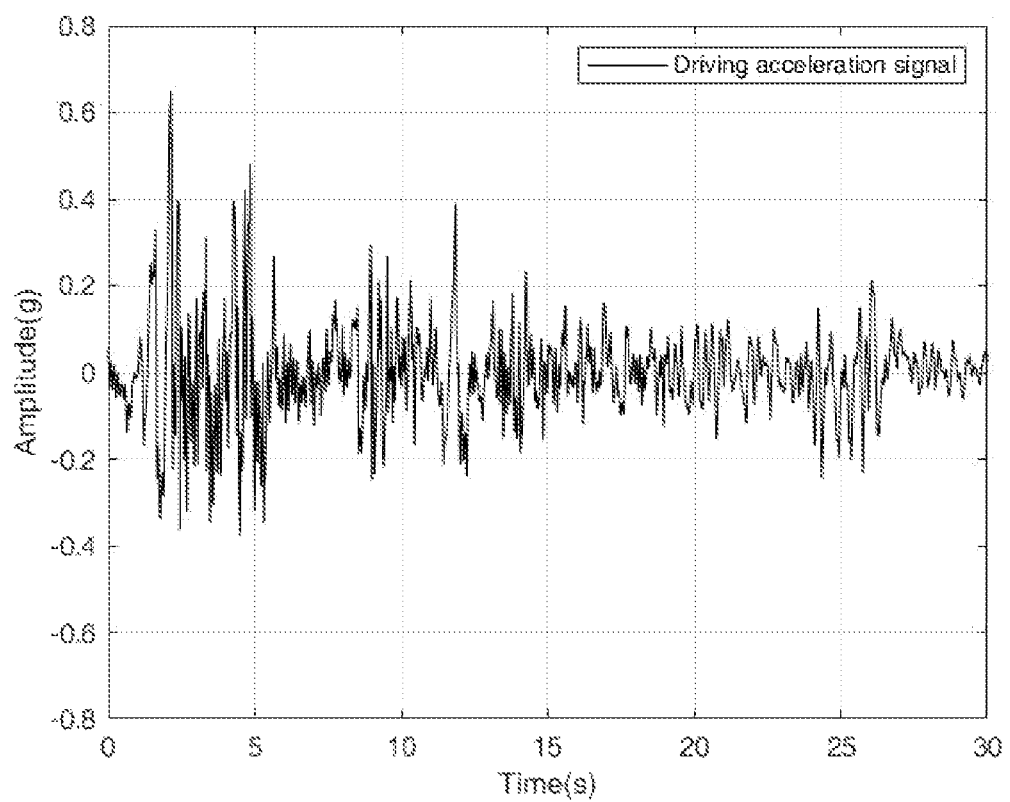
Figure 5:
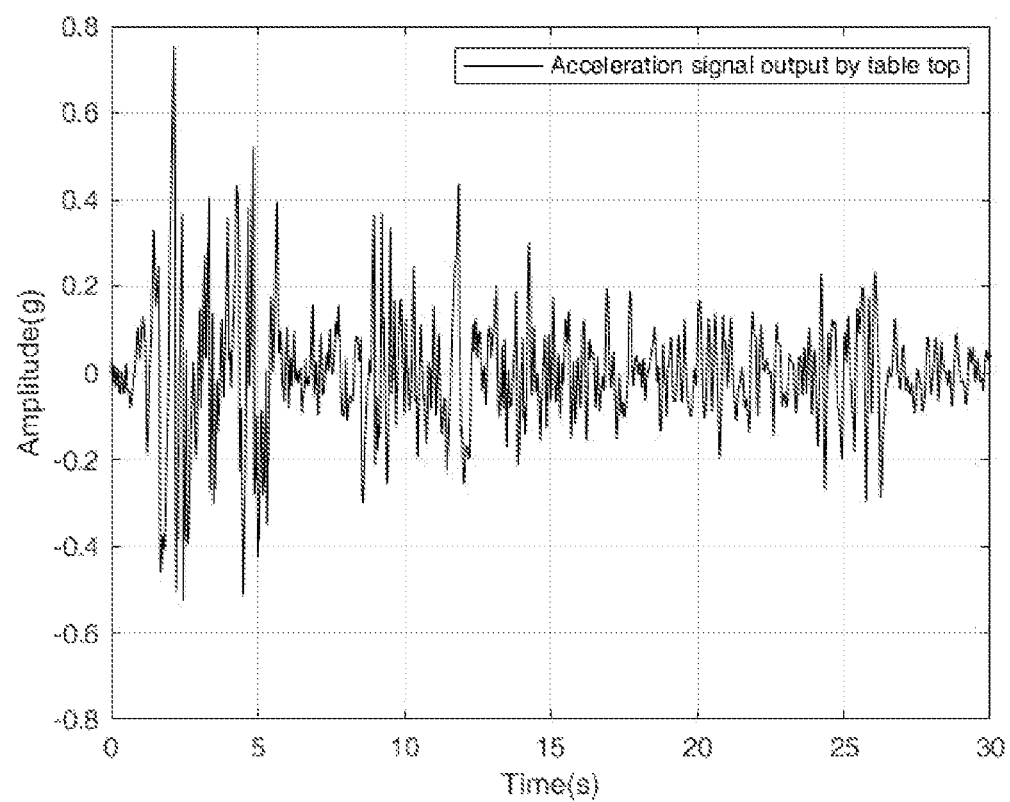
Figure 6:
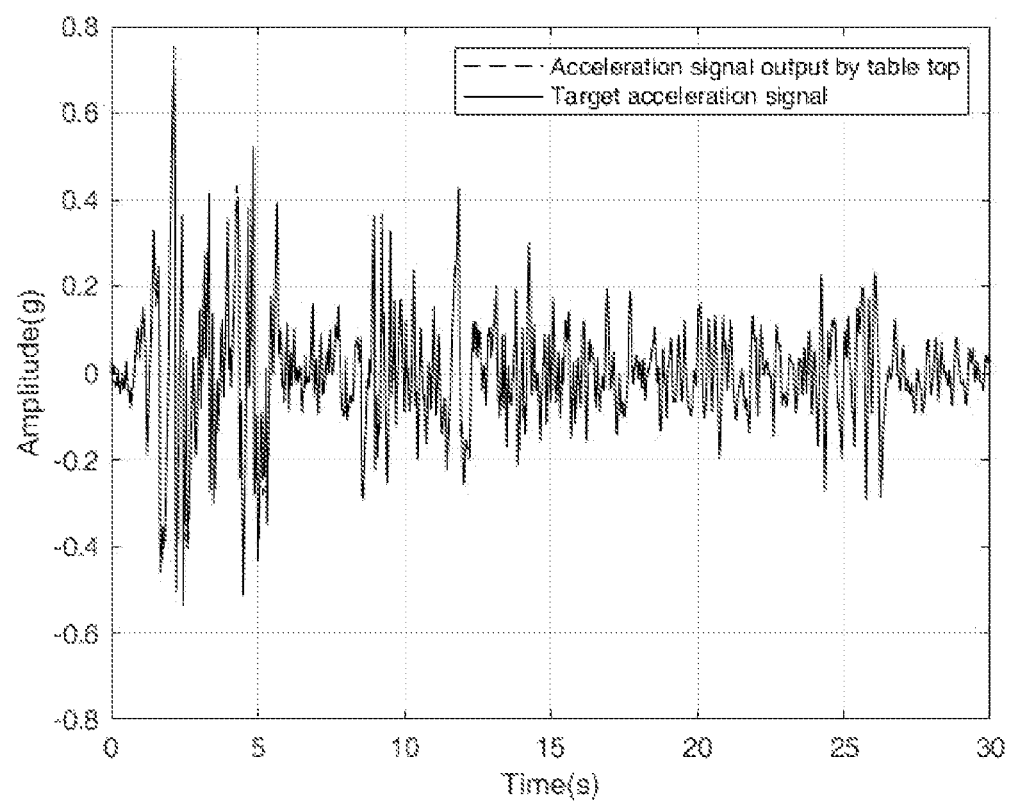

FIG. 2 shows a target acceleration signal of embodiments of the present disclosure;

FIG. 3 shows a feedback acceleration signal of the embodiments of the present disclosure;

FIG. 4 shows a driving acceleration signal computed in the embodiments of the present disclosure;

FIG. 5 shows an acceleration signal output by a table top in the embodiments of the present disclosure; and FIG. 6 is a comparison diagram of the acceleration signal output by a table top and the target acceleration signal in the embodiments of the present disclosure.

DETAILED DESCRIPTION OF THE EMBODIMENTS

The present disclosure will be further described with reference to the accompanying drawings and the embodiments.

Specific implementation steps of the present disclosure are as follows:

S1, a frequency domain amplitude transfer function H(f) of a system is computed according to a target acceleration signal a(n) and a feedback acceleration signal y(n), $$H(f) = \frac{|y(f)|}{|a(f)|}$$

where y(f) is a frequency spectrum of the feedback acceleration signal y(n), and a(f) is a frequency spectrum of the target acceleration signal a(n).

S2, the frequency domain amplitude transfer function H(f) is modified, specifically, S2-1, the power of the frequency domain amplitude transfer function H(f) of the system is adjusted, $$H(f) = \left(\frac{|y(f)|}{|a(f)|}\right)^\beta$$

where $\beta \in (0, 1)$, frequency spectra of an input signal and an output signal of an actual shaking table system are compared with each other, under the condition that a relative error is greater than or equal to 50%, a value of β is within (0, 0.5], and under the condition that the relative error is less than 50%, a value of β is within (0.5, 0.9), β=0.45 in the example;

S2-2, an amplitude of a frequency domain amplitude transfer function H(f) of the system is limited according to set minimum amplitude and maximum amplitude, $$H(f) = \begin{cases} \min\{H(f)\}, & H(f) \leq \min\{H(f)\} \\ H(f), \min\{H(f)\} < H(f) \leq \max\{H(f)\} \\ \max\{H(f)\}, & H(f) > \max\{H(f)\} \end{cases}$$

where min{H(f)} and max{H(f)} are the set minimum amplitude and maximum amplitude respectively, and min{H(f)}=0.5 and max{H(f)}=5 in the example.

S3, the driving acceleration signal u(n) is generated, specifically,

S3-1, inversion is conducted on a modified frequency domain amplitude transfer function H(f) of the system so as to obtain the inverse frequency domain amplitude transfer function $H^{-1}(f)$ of the system;

S3-2, the amplitude of the driving acceleration signal u(f) is computed by using an amplitude of the target acceleration signal a(f) and the inverse frequency domain amplitude transfer function $H^{-1}(f)$ of the system:

$$|u(f)| = |a(f)| * H^{-1}(f)$$

S3-3, a phase difference between the feedback acceleration signal y(f) and the target acceleration signal a(f) is computed, and the phase of the target acceleration signal a(f) is modified, so as to obtain the phase of the driving acceleration signal u(f):

$$\angle u(f) = \angle a(f) - (\angle y(f) - \angle a(f))$$

S3-4, the frequency domain driving acceleration signal u(f) is obtained by using the Euler's formula in a complex domain, and inverse Fourier transform is conducted to obtain a time domain driving acceleration signal u(n):

$$u(f) = |u(f)| * \cos(\angle u(f)) + i * |u(f)| * \sin(\angle u(f))$$

$$u(n) = \text{IFFT}(u(f))$$

where IFFT means the inverse Fourier transform.

S4, the shaking table is driven again to obtain an acceleration signal $y_d(n)$ output by the table top, a waveform correlation coefficient and a relative root mean square error are used as waveform evaluation indexes to evaluate whether the acceleration signal $y_d(n)$ output by the table top meets a shaking table test waveform use requirement.

Specific computation steps are as follows:

waveform correlation coefficient:

$$K_{XY} = \frac{\sum_{i=1}^{n} X(i)Y(i)}{\sqrt{\sum_{i=1}^{n}(X(i))^2 \sum_{i=1}^{n}(Y(i))^2}}$$

relative root mean square error:

$$RRMSE = \sqrt{\frac{\sum_{i=1}^{n}(Y(i) - X(i))^2}{\sum_{i=1}^{n}(X(i))^2}}$$

where X is the target acceleration signal, Y is the feedback acceleration signal, and n is the number of sampling points.

The shaking table test waveform use requirement is as follows: the waveform correlation coefficient K≥95% and the relative root mean square error RRMSE≤10%, the test is finished under the condition that the requirement is met, and the power β of the frequency domain amplitude transfer function H(f) is updated and the driving acceleration signal u(n) is generated again for the test according to the method under the condition that the requirement is not met.

In the embodiment, when β=0.45, obtained acceleration signal responding to the table top and target acceleration signal have the waveform correlation coefficient K=99.75% and the relative root mean square error RRMSE=8.9%, thus meeting the shaking table test waveform use requirement.

The above embodiments are merely preferred embodiments of the present disclosure, and are not intended to limit the present disclosure. Any modifications, equivalent replacements and improvements made within the spirit and principle of the present disclosure should fall within the protection scope of the present disclosure.

The invention claimed is:

1. A frequency domain feedforward compensation method for a shaking table that is used for a seismic simulation, the method comprising:

inputting a target acceleration signal a (n) into a shaking table system to obtain a feedback acceleration signal y(n);

performing a Fourier transform to the target acceleration signal a (n) and the feedback acceleration signal y(n) separately;

computing a frequency domain amplitude transfer function H (f);

modifying the frequency domain amplitude transfer function H (f) by using a power exponential method;

adjusting a power value β of the frequency domain amplitude transfer function H (f), wherein the power value β is between 0 and 1;

limiting minimum and maximum values of an amplitude of the frequency domain amplitude transfer function H (f);

computing an inverse frequency domain amplitude transfer function H" (f) of the shaking table system;

multiplying the inverse frequency domain amplitude transfer function H 1 (f) by an amplitude of a frequency spectrum a (f) of the target acceleration signal a (n) to obtain an amplitude of a frequency domain driving acceleration signal u(f);

obtaining a phase of the frequency domain driving acceleration signal u(f) by subtracting a phase difference between a frequency spectrum y (f) of the feedback acceleration signal y(n) and the frequency spectrum a (f) of the target acceleration signal a (n) from a phase of the frequency spectrum a (f) of the target acceleration signal a (n);

obtaining the frequency domain driving acceleration signal u(f) by using Euler's formula in a complex domain;

performing an inverse Fourier transform to the frequency domain driving acceleration signal u(f) to obtain a time domain driving acceleration signal u(n);

driving the shaking table to obtain an acceleration signal $y_d(n)$ outputted by a table top;

utilizing a waveform correlation coefficient K and a relative root mean square error RRMSE as waveform evaluation indexes to determine whether the acceleration signal $y_d(n)$ outputted by the table top meets a shaking table test waveform use requirement;

finishing a shaking table test under a first condition if the acceleration signal $y_d(n)$ meets the shaking table test waveform use requirement;

updating the power value β of the frequency domain amplitude transfer function H (f) and generating the time domain driving acceleration signal u(n) for the test under a second condition if the acceleration signal $y_d(n)$ does not meet the shaking table test waveform use requirement, wherein the frequency domain amplitude transfer function H (f) of the shaking table system is computed by:

$$H(f) = \frac{|y(f)|}{|a(f)|},$$

wherein y (f) is the frequency spectrum of the feedback acceleration signal y(n), and a (f) is the frequency spectrum of the target acceleration signal a (n);

wherein the power exponential method comprises:

S1, adjusting the power value β of the frequency domain amplitude transfer function H (f) of the shaking table system, $$H(f) = \left(\frac{|y(f)|}{|a(f)|}\right)^\beta,$$

wherein β∈ (0, 1), frequency spectra of an input signal and an output signal of an actual the shaking table system are compared with each other, under a condition that a relative error is greater than or equal to 50%, a value of β is within (0, 0.5), and under a condition that the relative error is less than 50%, the value of β is within (0.5, 0.9); and S2, limiting the amplitude of the frequency domain amplitude transfer function H (f) of the shaking table system according to a set minimum amplitude and a set maximum amplitude of the frequency domain amplitude transfer function H (f), $$H(f) = \begin{cases} \min\{H(f)\}, H(f) \le \min\{H(f)\} \\ H(f), \min\{H(f)\} < H(f) \le \max\{H(f)\}, \\ \max\{H(f)\}, H(f) > \max\{H(f)\} \end{cases}$$

wherein min {H (f)} and max {H (f)} are the set minimum amplitude and the set maximum amplitude respectively, and min {H (f)}=0.5 and max {H (f)}=5; and wherein generating the time domain driving acceleration signal u(n) comprises:

S1, conducting inversion on a modified frequency domain amplitude transfer function H (f) of the shaking table system to obtain the inverse frequency domain amplitude transfer function $H^{-1}$ (f) of the shaking table system;

S2, computing an amplitude of the frequency domain driving acceleration signal u(f) by using the amplitude of the frequency spectrum a (f) of the target acceleration signal a (n) and the inverse frequency domain amplitude transfer function $H^{-1}$(f) of the shaking table system:

$$|u(f)|=|a(f)|*H^{-1}(f)$$

S3, computing the phase difference between the frequency spectrum y (f) of the feedback acceleration signal y(n) and the frequency spectrum a (f) of the target acceleration signal a (n), and modifying the phase of the frequency spectrum a (f) of the target acceleration signal a (n), so as to obtain the phase of the frequency domain driving acceleration signal u(f):

$$\angle u(f)=\angle a(f)-(\angle y(f)-\angle a(f))$$

S4, obtaining the frequency domain driving acceleration signal u(f) by using the Euler's formula in the complex domain, and conducting the inverse Fourier transform to obtain the time domain driving acceleration signal u(n):

$$u(f)=|u(f)|*\cos(\angle u(f)+i*|u(f)|*\sin(\angle u(f)u(n)=\text{IFFT}(u(f)),$$

wherein IFFT means the inverse Fourier transform;

wherein the shaking table test is considered to be finished under the first condition if the acceleration signal $y_d(n)$ meets the shaking table test waveform use requirement, the shaking table test waveform use requirement being the waveform correlation coefficient to be K≥95% and the relative root mean square error to be RRMSE≤10%, and as per second condition, if the shaking table test waveform use requirement of the waveform correlation coefficient to be K≥95% and the relative root mean square error to be RRMSE≤10% is not meet, the power value $\beta$ of the frequency domain amplitude transfer function H (f) is updated again and the time domain driving acceleration signal u(n) is generated again for a new test to be performed on the shaking table system until the shaking table test waveform use requirement is met as per the first condition, wherein the new test is performed using the steps corresponding to the frequency domain feedforward compensation method.

* * * * *